United States Patent
Salas Linan et al.

(10) Patent No.: US 9,072,309 B2
(45) Date of Patent: Jul. 7, 2015

(54) HIGH MELTING POINT SUNFLOWER FAT FOR CONFECTIONARY

(75) Inventors: Joaquín Jesús Salas Linan, Seville (ES); Enrique Martinez Force, Seville (ES); Miguel Angel Bootello García, Seville (ES); Mónica Venegas Calerón, Seville (ES); Rafael Garcés, Seville (ES)

(73) Assignee: Consejo Superior De Investigaciones Cientificas (CSIC), Seville (ES)

( * ) Notice: Subject to any disclaimer, the term of this patent is extended or adjusted under 35 U.S.C. 154(b) by 0 days.

(21) Appl. No.: 13/503,331

(22) PCT Filed: Oct. 21, 2010

(86) PCT No.: PCT/EP2010/065842
§ 371 (c)(1),
(2), (4) Date: Jun. 29, 2012

(87) PCT Pub. No.: WO2011/048169
PCT Pub. Date: Apr. 28, 2011

(65) Prior Publication Data
US 2012/0269951 A1    Oct. 25, 2012

(30) Foreign Application Priority Data
Oct. 22, 2009   (EP) .................................... 09382222

(51) Int. Cl.
A23G 1/36    (2006.01)
A23G 1/38    (2006.01)
C11B 7/00    (2006.01)

(52) U.S. Cl.
CPC .. *A23G 1/36* (2013.01); *A23G 1/38* (2013.01); *C11B 7/00* (2013.01); *C11B 7/0008* (2013.01); *C11B 7/0075* (2013.01)

(58) Field of Classification Search
None
See application file for complete search history.

(56) References Cited

U.S. PATENT DOCUMENTS 4,199,611 A    4/1980  Toyoshima
7,141,267 B2 *  11/2006  Martinez Force et al. .... 426/629

FOREIGN PATENT DOCUMENTS

| EP | 1 878 786 A1 | 1/2008 |
| EP | 1 992 231 A1 | 11/2008 |
| ES | WO 00/74470 | * 12/2000 |
| WO | 01/96507 A1 | 12/2001 |

OTHER PUBLICATIONS

Fernandez-Moya, V et al. 2000 J. Agric Food Chem 48:764.*
Swern, D. 1979. Bailey's Industrial Oil and Fat Products, vol. 1, 4th edition. John Wiley & Sons. New York, p. 192-195.*
Bailey, A. 1950. Meltin and Solidifaction of Fats. Interscience Publishers, New York, p. 160-166.*
International Preliminary Report on Patentability mailed Nov. 21, 2011, issued in corresponding International Application No. PCT/EP2010/065842, filed Oct. 21, 2010, 12 pages.
International Search Report and Written Opinion mailed Dec. 29, 2010, issued in corresponding International Application No. PCT/EP2010/065842, filed Oct. 21, 2010, 9 pages.
Alvarez-Ortega, R., et al., "Characterization of Polar and Nonpolar Seed Lipid Classes from Highly Saturated Fatty Acid Sunflower Mutants,"Lipids 32(8):833-837, 1997.
Matissek, R., "Pflanzenfette in Schokolade-Rechtliche and Analytische Aspekte," Lebensmittelchemie 54: 25-30, 2000.

* cited by examiner

*Primary Examiner* — Carolyn Paden
(74) *Attorney, Agent, or Firm* — Christensen O'Connor Johnson Kindness PLLC

(57) ABSTRACT

The present invention is based on the finding that stearin fats, obtainable by dry or solvent fractionation of sunflower high-stearic and high-oleic oils, optionally with seeding with tempered stearin crystals, have a high solid fat content at temperatures higher than 30° C., even higher than cocoa butter or other high saturated tropical fats with a similar disaturated triacylglycerol content due to the presence of disaturated triacylgiycerols rich in stearic acid, and improved melting point due to the presence of arachidic and behenic acids in these disaturated triacylgiycerols, being at the same time healthier that actual fats made from palm, palm kernel and coconut oils, or hydrogenated and trasesterified vegetable oils.

29 Claims, 1 Drawing Sheet

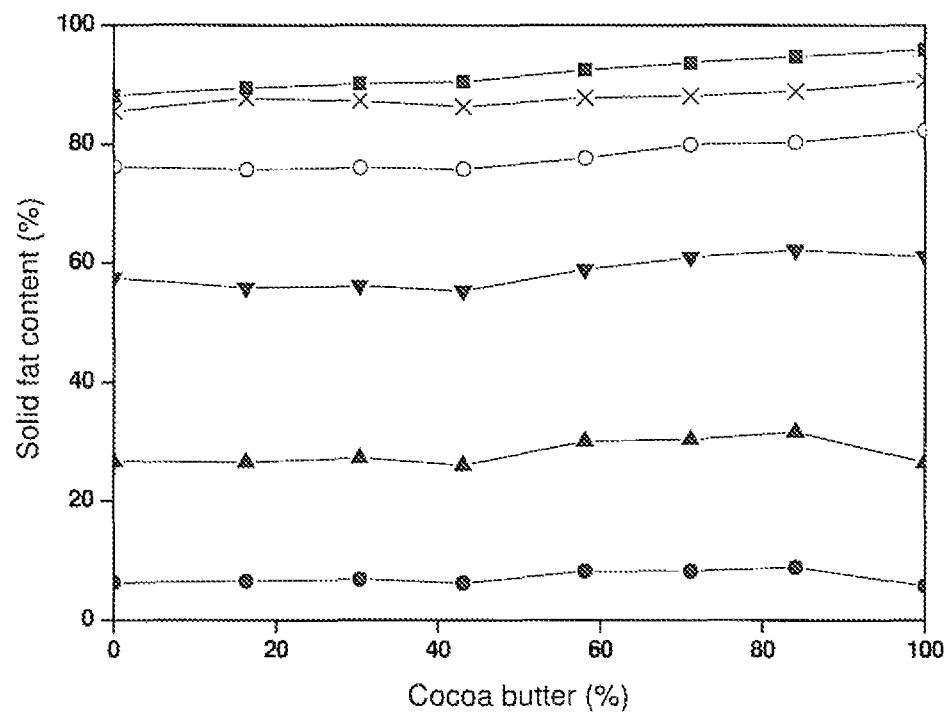

HIGH MELTING POINT SUNFLOWER FAT FOR CONFECTIONARY

FIELD OF THE INVENTION

The present invention relates to a solid fat made from high-oleate and high-stearate sunflower oil by fractionation.

BACKGROUND OF THE INVENTION

Unlike oils that are usually liquid and plastic fats which display broad melting intervals, confectionary fats have a sharp melting interval at temperatures above 30° C. The fat most used for this purpose is cocoa butter (CB), which displays high level of triacylglycerols (TAG) with the general formula SUS (70-90%), where S represents a saturated fatty acid in the sn-1,3 position of the TAG and U represents unsaturated fatty acid in the sn-2 position of the TAG. The typical composition of CB is shown in Table 1A, 1,3-distearoyl-2-oleoyl-glycerol (StOSt), 1-palmitoyl-2-oleoyl-3-stearoyl-glycerol (POSt) and 1,3-dipalmitoyl-2-oleoyl-glycerol (POP) being the most abundant TAG species.

TABLE 1A

Typical composition of the most abundant TAGs and TAG classes of cocoa butters from different origins.

|  | Ghana | Ivory Coast | Brazil |
|---|---|---|---|
|  | Triacylglycerol (%) | | |
| POP | 15.3 | 15.2 | 13.6 |
| POSt | 40.1 | 39.0 | 33.7 |
| StOSt | 27.5 | 27.1 | 23.8 |
|  | Triacylglycerol class (%) | | |
| SSS | 0.7 | 0.6 | Trace |
| SUS | 84.0 | 82.6 | 71.9 |
| SUU | 14.0 | 15.5 | 24.1 |
| UUU | 1.3 | 1.3 | 4.0 |

P = palmitic acid;
St = stearic acid;
O = oleic acid;
S = saturated fatty acid,
M = monoenoic fatty acid and
D = dienoic fatty acid,
U = unsaturated fatty acid The triacylglycerol composition of two cocoa butters and shea butter and their corresponding solid content between 30 and 40° C. are shown in Tables 1B and 2.

TABLE 1B

Triacylglycerol composition of two cocoa butters (CB1 and CB2) and shea butter.

|  | Triacylglycerol composition (%) | | |
|---|---|---|---|
|  | CB1 | CB2 | Shea |
| POP | 13.4 | 18.7 | 0.2 |
| POSt | 38.3 | 40.7 | 4.3 |
| PLP | 1.4 | 1.8 | 0.1 |
| POO | 2.3 | 3.0 | 1.7 |
| PLSt | 3.6 | 3.6 | 1.2 |
| POL | 0.3 | 0.4 | 0.5 |
| PLL | <0.1 | <0.1 | <0.1 |
| StOSt | 31.9 | 24.0 | 41.3 |
| StOO | 3.8 | 3.8 | 27.5 |
| StLSt | 2.4 | 1.8 | 5.7 |
| OOO | 0.3 | 0.2 | 5.2 |
| StOL | 0.5 | 0.4 | 5.2 |

TABLE 1B-continued

Triacylglycerol composition of two cocoa butters (CB1 and CB2) and shea butter.

|  | Triacylglycerol composition (%) | | |
|---|---|---|---|
|  | CB1 | CB2 | Shea |
| OOL | <0.1 | <0.1 | 1.3 |
| StLL | <0.1 | <0.1 | 1.2 |
| OLL | <0.1 | <0.1 | 0.4 |
| AOSt | 1.9 | 1.1 | 2.5 |
| OOA | <0.1 | 0.1 | 1.5 |
| OLA | <0.1 | <0.1 | <0.1 |

P = palmitic acid;
St = stearic acid;
O = oleic acid;
L = linoleic acid;
A = araquidic acid;
B = behenic acid

TABLE 2

Content of solids at different temperatures of two cocoa butters (CB1 and CB2) and shea butter.

|  | Temperature (° C.)/Solid content (%) | | | | |
|---|---|---|---|---|---|
|  | 30° C. | 32.5° C. | 35° C. | 37.5° C. | 40° C. |
| CB1 | 61.1 | 43.6 | 26.5 | 13.8 | 5.8 |
| CB2 | 48.2 | 21.7 | 5.9 | 0.5 | 0.0 |
| Shea | 54.4 | 40.8 | 25.9 | 13.7 | 5.8 |

P = palmitic acid;
St = stearic acid;
O = oleic acid;
L = linoleic acid;
A = araquidic acid;
B = behenic acid Cocoa butter displays a complex polymorphic behavior, with six crystalline forms that give place to five different polymorphs. Furthermore, the melting interval of this fat is very sharp. The physical properties of this fat confer to chocolate and confectionary products their typical characteristics involving high solid contents and quick melting in the mouth, conferring a fresh sensation and quickly releasing flavours.

The world production of CB is constrained by low productivity of cocoa tree, a restricted area of production and the attacks of pests on the crop. This situation contrasted with the increasing world demand of this fat, which causes tensions in this market involving frequent price raises.

The alternatives to CB for the production of confectionary fats consisted of palmitic and lauric fats obtained from palm, palm kernel or coconut oils or oils hardened by hydrogenation. Former fats are rich in palmitic, lauric and myristic fatty acids, displaying high levels of saturated fatty acids in the sn-2 position. These fats have been demonstrated to increase the levels of blood plasma cholesterol inducing arteriosclerosis.

The intake of hydrogenated fats is neither recommendable for cardiovascular health due to their content in trans-fatty acids that alter cholesterol metabolism, increasing the fraction associated to LDL proteins and decreasing the cholesterol associated to HDL ones. Alternative sources to CB are tropical fats rich in StOSt like shea, illipe, kokum or mango.

These sources of fat for confectionary products are not atherogenic but still their supply is not regular, provided these species are not usually crops but their fruits and seeds are harvested from the wild, moreover they are produced in areas with a poor communication and with irregular supply. These fats are usually mixed with some palm fractions rich in POP prior to be used in confectionary fat formulations.

Furthermore, in the last years new alternative sources of StOSt for confectionary have appeared. They come from oil crops that have been modified by genetic engineering by increasing their levels of stearic acid, such as soybean and oilseed rape. These are plants with seeds growing in green capsules or siliques, which involve the presence of linolenic acid in their oils in important amounts, and also linoleic acid. The presence of linolenic acid is not desired in confectionary fats due to the fact that it is unstable to oxidation and it possesses a very low melting point (−11° C.), which decreases their solid fat contents at room temperature or higher. These fats could be also used for plastic fats, to make spreads, shortening and margarine, displaying broad melting intervals. Examples of all these applications with fractionated oils can be found in WO99/57990 were high-stearic and high-oleic soybean oil is used to produce a fat suitable for confectionary, or in WO00/19832 were high-stearic and high-oleic rapeseed oil was used to make similar products, but unfortunately with some linolenic acid (18:3), and with less that 3% of solid content at temperatures above 33.3° C. This is useful to make shortening and spreads, but is less suitable for confectionary.

High-stearic and high-oleic sunflower oils have also been fractionated to obtain olein fractions for frying oils (WO2008/006597) and to produce a fat suitable for structuring a liquid vegetable oil, making a typical spreadable fat with broad melting point (WO01/96507).

A need remains for alternative fats for use in confectionary products.

SUMMARY OF THE INVENTION

The present invention is based on the finding that stearin fats, obtainable by dry or solvent fractionation of sunflower high-stearic and high-oleic oils, optionally with seeding with tempered stearin crystals, have a high solid fat content at temperatures higher than 30° C., even higher than cocoa butter or other high saturated tropical fats with a similar disaturated triacylglycerol content due to the presence of disaturated triacylglycerols rich in stearic, arachidic and behenic fatty acids. These triacylglycerols increase the melting point of the fat incrementing the content of solids at these temperatures, which helps to keep the properties of confectionary products, particularly when they are occasionally exposed to moderately high temperatures.

The novel sunflower fats of the invention do not have triacylglycerols that contain linolenic acid. In this regard, the fat of the invention is an alternative to CB or tropical fats that are rich in StOSt, such as rhea, illipe, kokum or mango, for use in confectionary products.

The fat of the invention is not atherogenic, due to its high-oleic and high-stearic acid contents, which does not affect the levels of blood cholesterol. Moreover, it is trans-free and possesses very low amounts of saturated fatty acids in the sn-2 position.

The fat of the invention can be produced by physical means from high-stearic and high-oleic sunflower oil, which ensures a regular and reliable supply of this product. Furthermore, the fat of the invention is free (<0.5%) of linolenic acid and contains arachidic (A) and behenic (B) fatty acids esterified to the sn-1,3 position of the triacylglycerols, forming amongst others 1-arachidoyl-2-oleoyl-3-stearoyl-glycerol (AOSt) and 1-behenoyl-2-oleoyl-3-stearoyl-glycerol (BOSt) that confer a higher amounts of solids at room temperature than other confectionary fats, keeping a melting interval appropriate for confectionary.

In one embodiment, the invention provides a fat containing between at least 32.5%, preferably at least 40%, more preferably at least 50%, even more preferably at least 60%, most preferably 74.3% of the triacylglycerol StOSt, at least 3.2%, preferably at least 4.5%, more preferably at least 5.5%, most preferably 8.1% of AOSt and at least 3.3%, preferably at least 5%, more preferably at least 8%, most preferably 10.3% of BOSt in its triacylglycerol fraction, wherein the fatty acids in positions sn-1 and sn-3 of the glycerol are the two external characters in the triacylglycerol (TAG) formula and St represents stearic acid, O represents oleic acid, A represents arachidic acid and B represents behenic acid. The fat of the invention is a non-hydrogenated, non-palmitic and non-lauric fat, it has not been transesterified and it is especially suitable for confectionary products.

In one embodiment, the invention provides a fat containing between 32.5% and 74.3%, preferably between 35 and 70%, more preferably between 40 and 60%, even more preferably between 45 and 55% of the triacylglycerol StOSt, between 3.2 and 8.1%, preferably between 4 and 7%, more preferably between 4.5 and 5.5% of AOSt and between 3.3 and 10.3%, preferably between 4.5 and 9%, more preferably between 5 and 8%, even more preferably between 6 and 7% of BOSt in its triacylglycerol fraction, wherein the fatty acids in positions sn-1 and sn-3 of the glycerol are the two external characters in the triacylglycerol (TAG) formula and St represents stearic acid, O represents oleic acid, A represents arachidic acid and B represents behenic acid. The fat of the invention is a non-hydrogenated, non-palmitic and non-lauric fat, it has not been transesterified and it is especially suitable for confectionary products.

In one embodiment, the fat comprises in its triacylglycerol fraction at least 49.1% triacylglycerol of the general formula SUS.

Particular embodiments of the invention are fats having the following combinations of StOSt, AOSt, BOSt and SUS as in Table 3.

TABLE 3

Selected disaturated triacylglycerol content of some fats of this invention.

| Fat | StOSt | AOSt | BOSt | SUS |
|---|---|---|---|---|
| SH 1 | 52.5 | 6.9 | 8.0 | 79.6 |
| SH 2 | 57.5 | 8.0 | 10.3 | 87.5 |
| SH 3 | 37.1 | 6.3 | 6.9 | 64.6 |
| SH 4 | 52.5 | 6.9 | 8.0 | 79.0 |
| SA 1 | 37.7 | 5.4 | 5.3 | 59.3 |
| SA 2 | 57.8 | 7.7 | 5.0 | 79.3 |
| SA 3 | 35.8 | 4.4 | 4.4 | 60.3 |
| SA 4 | 32.5 | 3.2 | 3.3 | 49.1 |
| SA 5 | 56.0 | 7.4 | 8.4 | 85.2 |
| SH 5 | 39.9 | 6.9 | 7.9 | 71.3 |
| SH 6 | 65.3 | 7.0 | 8.2 | 87.4 |
| SH 7 | 67.3 | 7.4 | 8.3 | 90.6 |
| SH 8 | 74.3 | 7.1 | 6.6 | 95.5 |
| SA 6 | 42.8 | 5.8 | 5.8 | 67.2 |
| SA 7 | 39.5 | 6.9 | 7.7 | 68.8 |
| SA 8 | 41.4 | 6.8 | 7.1 | 71.8 |
| SA 9 | 43.7 | 7.4 | 8.1 | 75.4 |
| SA 10 | 46.9 | 8.1 | 8.4 | 80.5 |
| SA 11 | 52.7 | 7.4 | 8.1 | 81.3 |
| SA 12 | 53.2 | 7.2 | 7.5 | 82.1 |

The present invention thus relates to a high melting point stearin obtainable by solvent or dry fractionation, optionally seeding with tempered stearin crystals or optionally cooling down the oil to a temperature low enough to induce quick formation of crystal nuclei (i.e. the nucleation temperature), of previously known high-stearic high-oleic sunflower oil. The fat of the invention is especially appropriate as an alternative to cocoa butter and for the preparation of confectionary fats. The fat is trans-free and contains very low amounts of saturated fatty acids in the sn-2 position. This fat is rich in stearate and oleate, which are fatty acids that do not increase the levels of blood cholesterol in humans. Furthermore, their content of linolenic acid is negligible, thereby providing high oxidative stability.

The fat of the invention contains high enough levels of TAG of the type AOSt and BOSt in its composition to increase the amount of solids when compared with fats having similar amounts of stearic acid. This is of special interest for certain uses in confectionary and to avoid blooming in temperate climates. Blooming is caused by the loss of template of chocolate caused by high temperatures, producing undesirable whitish discoloration on the surface of chocolate products. The presence of fatty acids with chain lengths longer than stearic has a "memory" effect that helps to keep the correct template of confectionary.

The fats of the invention are prepared from high-stearic high-oleic sunflower oil that can for example be extracted from seeds as described in WO00/74470. A typical TAG composition of the oils disclosed in WO00/74470 includes StOSt, POSt, AOSt and BOSt but in amounts that are not enough to provide high solid fats. Therefore, those TAG have to be concentrated by dry or solvent fractionation to produce a fat with the levels of solids adequate for confectionary.

Dry fractionation involves cooling the oil to a temperature between 16 and 22° C. and keeping it at this temperature for up to 30 h, and subsequent filtration applying a pressure up to 10 bars to expel the remaining olein.

Fat fractions obtained after dry fractionation are sometimes not suitable for use as a CB alternative in confectionary. They are however suitable for preparing confectionary fats by further fractionation. Such fractions are for example SD1, SD2, SD3 and SD4 as described in the examples. Such fraction of high-stearic high-oleic oil for use as a starting product in the preparation of some solid fat of the invention comprises in its triacylglycerol fraction at least 30% triacylglycerol of the general formula SUS, between 20.8% and 74.3% triacylglycerol of the general formula StOSt, between 2.9 and 8.1% triacylglycerol of the general formula AOSt and between 3.1 and 10.3% triacylglycerol of the general formula BOSt, wherein the fatty acids in positions sn-1 and sn-3 of the glycerol are the two external characters in the triacylglycerol (TAG) formula, S represents a saturated fatty acid, U represents an unsaturated fatty acid, St represents stearic acid, O represents oleic acid, A represents arachidic acid and B represents behenic acid.

Solvent fractionation involves mixing the oil with an organic solvent following the cooling of the resulting micelles at temperatures lower than 15° C.

Improved fractionation, in particular quicker fractionation, could be obtained by seeding oils at the beginning of fractionation with tempered stearin crystals or by cooling the oil to its nucleation temperature.

In one embodiment the solvent fractionation is performed with hexane as the solvent. When using high-stearic high-oleic oils or stearins from dry fractionation, fractionation with hexane leads to fats that are comparable to CB with respect to their solids content at 35° C.

The fat of the invention is fully compatible with cocoa butter and can be blended with it in any proportion without causing a decrease of the melting point of the mixtures. This fat can assure a regular and controlled supply of confectionary fats since it can be produced from a temperate crop such as sunflower.

BRIEF DESCRIPTION OF THE DRAWINGS

FIG. 1 shows the solid fat content of different blends of cocoa butter and solvent fractionated high stearic high oleic sunflower stearin at different temperatures.

DETAILED DESCRIPTION OF THE INVENTION

The object of the present invention is to provide a solid fat for confectionary that is healthy and can be produced from the commodity sunflower in countries with a temperate climate. This is achieved by the fact that it is prepared from high-stearic high-oleic sunflower oil. The composition of this fat makes it possible to have a high level of solids at room temperature and a melting interval adequate for confectionary applications.

The fat of the invention is prepared by fractionation of the above mentioned oil and satisfies the following requirements:
  it contains between 49.1 and 95.5% of TAG with the general formula SUS
  it contains between 32.5 and 74.3% of StOSt, and between 3.2 and 8.1% of the AOSt and between 3.3 and 10.3% of BOSt
  it contains between 0 and 0.5% linolenic acid
  it has a high solid fat content (38.9 to 94.5%) at temperature of 30° C.

The fat of the invention is obtainable by low temperature dry fractionation applying the following steps:
  a) heating a high-stearic high-oleic oil up to 60° C. and decreasing the temperature to reach temperatures from 16 to 22° C., preferably 17 to 19° C. with soft stirring, while optionally adding tempered crystals for seeding, and maintaining the oil at this temperature for 20 to 50 hours, preferably between 24 to 35 hours;
  b) separating the solid stearin from the olein by filtration;
  c) pressing the stearin cake, preferably up to 5 bar, in particular up to 10 bar, even better up to 30 bar, to expel the remaining olein trapped in it.

In another embodiment the fat of the invention can be prepared by solvent fractionation in a process involving the following steps:
  a) mixing a high-stearic high-oleic oil with an organic solvent, in particular acetone, hexane or ethyl ether;
  b) decreasing the temperature of the resulting micelle to −3 to 15° C., preferably between 2-10° C., with soft stirring, while optionally adding tempered crystals for seeding, for up to 96 hours;
  c) separating the solid stearin fraction by filtration;
  d) washing the solid phase with cold fresh solvent to remove the rest of the micelles entrapped into the precipitate; and
  e) removing the solvent, preferably by distillation at vacuum.

The starting material to produce the fat of the invention is high-stearic high-oleic sunflower oil that can be extracted from seeds described in WO00/74470 or Pleite, R. et al. (Journal of Agricultural and Food Chemistry 2006, 54: 9383-8). This oil can be extracted from those seeds by conventional methods involving the crushing of the seeds, and the extraction in a Sohxlet-apparatus after addition of sodium sulphate using hexane as the solvent.

The fractionation method can be improved in time and quality by seeding with the appropriate tempered stearin crystals. These stearin crystals can be obtained from high-stearic and high-oleic stearin fractions by tempering or pre-crystalization at temperatures of around 20 to 24° C. for at least 24 hours.

The content of triacylglycerols with the general formula SUS, wherein the sn-1,3 fatty acids are the two external characters and S represents saturated fatty acid, U represents unsaturated fatty acids, in the above mentioned oil is not enough for uses in confectionary. Therefore, this oil has to be fractionated to produce the fat of the invention. Oil fractionation involves only physical steps including the cooling of the oil in the optional presence of any organic solvent, the separation of the resulting precipitate by filtration and the removal, if necessary, of the solvent by distillation. The resulting fats have increased levels of TAG of the general formula SUS. The TAG and TAG classes composition of initial oil and different fractions are shown in Tables 4 and 5.

TABLE 4

Triacylglycerol composition of a high-stearic high-oleic sunflower oils (HStHO 1), compared with precipitates obtained from the same oil by dry fractionation (SD 1) or solvent fractionation (SH 1).

| | Triacylglycerol content (%) | | |
|---|---|---|---|
| | HStHO 1 | SD 1 | SH 1 |
| POP | 0.4 | 0.4 | 0.6 |
| POSt | 2.7 | 5.6 | 11 |
| POO | 7.6 | 5.3 | 1.6 |
| POL | 1.0 | 0.7 | <0.1 |
| PLL | <0.1 | <0.1 | <0.1 |
| StOSt | 4.4 | 20.8 | 52.5 |
| StOO | 33.0 | 24.6 | 8.9 |
| StLSt | 0.7 | 0.6 | 0.6 |
| OOO | 31.9 | 22.8 | 6.3 |
| StOL | 4.4 | 3.4 | 1.0 |
| OOL | 5.2 | 3.9 | 1.0 |
| OLL | 0.8 | 0.5 | <0.1 |
| AOSt | 0.8 | 2.9 | 6.9 |
| OOA | 2.9 | 2.1 | 0.7 |
| OLA | <0.1 | <0.1 | <0.1 |
| BOSt | 0.7 | 3.1 | 8.0 |
| OOB | 3.7 | 3.1 | 0.9 |

P = palmitic acid;
St = stearic acid;
O = oleic acid;
L = linoleic acid;
A = araquidic acid;
B = behenic acid The original content of TAG with the general formula SUS was increased by around 4 times by dry fractionation and by around 8 times by solvent fractionation, resulting in fats appropriate for confectionary uses. Those fats displayed contents of the TAGs AOSt and BOSt from 3% to 8% for each, which increased the content of solids in the fats. These stearins can be used for the production of confectionary products and chocolates alone or mixed with CB or tropical fats rich in StOSt such as shea, illipe, kokum or mango or other confectionary fats. The fats of the invention are fully compatible with CB, producing neither eutectics nor any decrease in the melting point of the final mixture when mixed with CB.

TABLE 5

Triacylglycerol class composition of a high-stearic high-oleic sunflower oils (HStHO 1), compared with precipitates obtained from the same oil by dry fractionation (SD 1) or solvent fractionation (SH 1).

| | Triacylglycerol class content (%) | | |
|---|---|---|---|
| | HStHO 1 | SD 1 | SH 1 |
| SMS | 9.0 | 32.8 | 79.0 |
| SMM | 47.2 | 35.1 | 12.1 |
| SDS | 0.7 | 0.6 | 0.6 |
| SDM | 5.4 | 4.1 | 1.0 |
| SDD | <0.1 | <0.1 | <0.1 |
| MMM | 31.9 | 22.8 | 6.3 |
| MMD | 5.2 | 3.9 | 1.0 |
| MDD | 0.8 | 0.5 | <0.1 |
| SUS | 9.6 | 33.4 | 79.6 |
| SUU | 52.6 | 39.2 | 13.1 |
| UUU | 37.9 | 27.2 | 7.3 |

S = saturated fatty acid,
M = monoenoic fatty acid and
D = dienoic fatty acid,
U = unsaturated fatty acid.

The fat of the invention can be produced from any type of high-stearic high-oleic sunflower oil, maintaining similar TAG compositions and melting profiles. Using oils with higher contents of stearic acid do not change significantly the composition of the stearins resulting from dry or solvent fractionation. Therefore, Tables 6 and 7 show the TAG composition of stearins resulting from high-stearic high-oleic oil containing a higher level of stearic acid (HStHO 2). This oil reached a level of the TAG StOSt of 7.5%, yielding stearins similar in composition to those from the oil HStHO 1.

TABLE 6

Triacylglycerol composition of a high-stearic high-oleic sunflower oils (HStHO 2), compared with precipitates obtained from the same oil by dry fractionation (SD 2) or solvent fractionation (SH 2).

| | Triacylglycerol content (%) | | |
|---|---|---|---|
| | HStHO 2 | SD 2 | SH 2 |
| POP | 0.7 | 0.7 | 0.6 |
| POSt | 4.7 | 6.8 | 10.7 |
| POO | 9.2 | 6.4 | 1.2 |
| POL | 0.8 | 0.7 | <0.1 |
| PLL | <0.1 | <0.1 | <0.1 |
| StOSt | 7.4 | 23.1 | 57.5 |
| StOO | 34.4 | 26.2 | 6.5 |
| StLSt | 1.1 | 0.6 | 0.4 |
| OOO | 23.5 | 16.6 | 2.9 |
| StOL | 3.5 | 2.8 | 0.5 |
| OOL | 3.1 | 2.2 | 0.3 |
| OLL | 0.1 | 0.3 | <0.1 |
| AOSt | 1.8 | 3.7 | 8.0 |
| OOA | 3.4 | 2.4 | 0.5 |
| OLA | <0.1 | <0.1 | <0.1 |
| BOSt | 1.5 | 3.7 | 10.3 |
| OOB | 5.1 | 3.9 | 0.7 |

P = palmitic acid;
St = stearic acid;
O = oleic acid;
L = linoleic acid;
A = araquidic acid;
B = behenic acid.

TABLE 7

Triacylglycerol class composition of a high-stearic high-oleic sunflower oils (HStHO 2), compared with precipitates obtained from the same oil by dry fractionation (SD 2) or solvent fractionation (SH 2).

| | Triacylglycerol class content (%) | | |
|---|---|---|---|
| | HStHO 2 | SD 2 | SH 2 |
| SMS | 15.9 | 37.8 | 87.1 |
| SMM | 52.1 | 38.9 | 8.9 |
| SDS | 1.1 | 0.6 | 0.4 |
| SDM | 4.3 | 3.6 | 0.6 |
| SDD | <0.1 | <0.1 | <0.1 |
| MMM | 23.5 | 16.6 | 2.9 |
| MMD | 3.1 | 2.2 | 0.3 |
| MDD | 0.1 | 0.3 | <0.1 |
| SUS | 17.0 | 38.4 | 87.5 |
| SUU | 56.4 | 42.5 | 9.5 |
| UUU | 26.7 | 19.1 | 3.2 |

S = saturated fatty acid,
M = monoenoic fatty acid and
D = dienoic fatty acid,
U = unsaturated fatty acid The high melting point stearins obtained from high-stearic high-oleic sunflower oils by fractionation constitute the fat of this invention and are especially appropriate for confectionary uses. This fat has higher levels of solids than other confectionary fats having a similar content of disaturated triacylglycerols due to the high content of StOSt, and mainly of AOSt and BOSt, but keeping a melting interval adequate for confectionary.

Since these stearins are trans-free fatty acids, they can be used for the production of confectionary products and chocolates alone or mixed with CB. The fats of the invention are fully compatible with CB, producing no eutectics, nor any decrease in the melting point of the final mixture when mixed with CB.

The fats of the invention are stable and do not contain linolenic, lauric or myristic acids in percentages higher than 0.5%, preferably not higher than 0.3%, more preferably not higher than 0.1%, of the total fatty acids.

The invention will be further illustrated in the Examples that follow. In the Examples reference is made to the FIG. 1 which shows the solid fat content of different blends of cocoa butter and the fat SH 5 (Tables 18 and 19) at different temperatures (5° C. (-■-), 15° C. (-x-), 25° C. (-○-), 30° C. (-▼-), 35° C. (-▲-) and 40° C. (-●-).

EXAMPLES

Example 1

1. Plant Material

High-stearic and high-oleic sunflower seeds as described in WO00/74470 or in Pleite, R. et al, (Journal of Agricultural and Food Chemistry 2006, 54: 9383-8) were used.

2. Extraction of the Oil

Seed oil was extracted using a continuous oil press. Batches of oil were extracted and then refined. Since these oils displayed a low content of phosphate they were not degummed. Removal of the excess of free fatty acids was carried out by neutralization with 12√ Baumé (2.18 M) lye at 15° C. for 40 min. Soapstocks were removed by centrifugation and the oil was then water washed. The next step was oil bleaching by treatment with activated bleaching clay (1% w/w) at 70° C. for 10 min. Finally the oil was deodorized by applying 3% steam at 200° C. for 3 h under vacuum,

3. Analysis of TAG

The composition of TAG molecular species was carded out by gas chromatography of the purified TAG in an Agilent 6890 gas chromatograph using a 30 m. Quadrex aluminum-clad bonded methyl 65% phenyl silicone capillary column, 025 mm I.D., 0.1 micron film thickness, hydrogen as the carder gas and FID detector, according to Fernandez-Moya et al. J. Agr. Food Chem. 2000, 48, 764769.

Example 2

1. Dry Fractionation of High-Stearic High-Oleic (HStHO) Sunflower Oil

HStHO 1 and HStHO 2 oil (Tables 4 and 6) without the addition of any solvent were loaded into a jacketed reactor. The oil was heated to 40° C. with continuous slow stirring (30 rpm). Then the oil was cooled to 19° C. decreasing the temperature from 40° C. using a linear ramp of 2 h. Seeding was performed by adding tempered stearin crystals obtained from previous fractionation. These stearin crystals were obtained from previous stearin fractions by tempering or pre-crystallization at temperatures of around 20 to 24° C. for 24 hours.

Once at 19° C. the oil temperature was kept constant with continuous slow stirring (10-30 rpm) for 30 h. Thereafter, the white stearin precipitate formed was filtered at vacuum using a jacketed filtration plate and miracloth tissue (Calbiochem) as the filtrating media. The precipitate was let to drain at vacuum for 2 extra hours to remove the olein entrapped into the precipitate. The resulting stearin displayed an incremented amount of disaturated TAG with respect to the starting oil (Table 8). An equivalent increment was observed on total disaturated classes of TAG (Table 9).

TABLE 8

Triacylglycerol composition of a high-stearic high-oleic sunflower oil (HStHO 1), compared with a precipitate obtained from the same oil by dry fractionation at 19° C. (SD 3).

| | Triacylglycerol content (%) | |
|---|---|---|
| Triacylglycerol | HStHO 1 | SD 3 |
| POP | 0.4 | 0.5 |
| POSt | 2.7 | 6.2 |
| POO | 7.6 | 4.7 |
| POL | 1.0 | 0.7 |
| PLL | <0.1 | <0.1 |
| StOSt | 4.4 | 24.2 |
| StOO | 33.0 | 23.0 |
| StLSt | 0.7 | 1.0 |
| OOO | 31.9 | 20.8 |
| StOL | 4.4 | 3.5 |
| OOL | 5.2 | 3.3 |
| OLL | 0.8 | 0.4 |
| AOSt | 0.8 | 3.3 |
| OOA | 2.9 | 1.9 |
| OLA | <0.1 | <0.1 |
| BOSt | 0.7 | 3.5 |
| OOB | 3.7 | 2.9 |

P = palmitic acid;
St = stearic acid;
O = oleic acid;
L = linoleic acid;
A = araquidic acid;
B = behenic acid

TABLE 9

Triacylglycerol class composition of a high-stearic high-oleic sunflower oils (HStHO 1), compared with precipitates obtained from the same oil by dry fractionation (SD 3).

| Triacylglycerol | Triacylglycerol class content (%) | |
|---|---|---|
|  | HStHO 1 | SD 3 |
| SMS | 8.9 | 37.7 |
| SMM | 47.2 | 32.5 |
| SDS | 0.7 | 1.0 |
| SDM | 5.4 | 4.2 |
| SDD | <0.1 | <0.1 |
| MMM | 31.9 | 20.8 |
| MMD | 5.2 | 3.3 |
| MDD | 0.8 | 0.4 |
| SUS | 9.6 | 38.7 |
| SUU | 52.6 | 36.7 |
| UUU | 37.9 | 24.5 |

S = saturated fatty acid,
M = monoenoic fatty acid and
D = dienoic fatty acid,
U = unsaturated fatty acid

2. Dry Fractionation of High-Stearic High-Oleic Sunflower Oil in a Pilot Plant An amount of 10 L of high-stearic high-oleic oil was loaded in the crystallizer of a crystallization pilot plant from DesMet Ballestra. The oil was heated to 40° C. and then temperature was ramped to 18° C. for 2 h with slow stirring (10 rpm). Once the oil reached 18° C., seeding was performed with tempered stearin crystals obtained from previous fractionation, and was kept at that temperature for 30 h.

Then it was fed to a press filter thermostatized at 18° C. and endowed with a nylon or plastid filtrating membrane by increasing the pressure inside the crystallizer to 2 bar with pressurized air. Once the press filter was filled with stearin crystal, the connection with the crystallizer was closed and the cake was squeezed by increasing the pressure into the press filter, firstly by applying pressurized air up to 5 bar and then pumping manually water into the pilot plant pressure circuit up to 30 bar for 2 h. Finally, pressure was released and the stearin cake was collected from the filter.

Results from fractionation are shown in tables 10 and 11. They were similar to that found in the laboratory scale experiments, with enrichments of 4-5 times of the content of StOSt and disaturated triacylglycerols, which makes this fat closer to confectionary fats than the initial oil.

TABLE 10

Triacylglycerol composition of a high-stearic high-oleic sunflower oil (HStHO 1), compared with a precipitate obtained from the same oil by dry fractionation at 18° C. in a pilot plant (SD 4).

| Triacylglycerol | Triacylglycerol content (%) | |
|---|---|---|
|  | HStHO 1 | SD 4 |
| POP | 0.4 | 0.5 |
| POSt | 2.7 | 6.3 |
| POO | 7.6 | 5.5 |
| POL | 1.0 | 0.8 |
| PLL | <0.1 | <0.1 |
| StOSt | 4.4 | 21.5 |
| StOO | 33.0 | 23.7 |
| StLSt | 0.7 | 0.8 |
| OOO | 31.9 | 21.6 |
| StOL | 4.4 | 3.4 |
| OOL | 5.2 | 2.0 |
| OLL | 0.8 | 2.5 |
| AOSt | 0.8 | 3.2 |
| OOA | 2.9 | 2.1 |
| OLA | <0.1 | <0.1 |
| BOSt | 0.7 | 3.3 |
| OOB | 3.7 | 2.9 |

P = palmitic acid;
St = stearic acid;
O = oleic acid;
L = linoleic acid;
A = araquidic acid;
B = behenic acid

TABLE 11

Triacylglycerol class composition of a high-stearic high-oleic sunflower oils (HStHO 1), compared with precipitates obtained from the same oil by dry fractionation at 18° C. in a pilot plant (SD 4).

| Triacylglycerol | Triacylglycerol class content (%) | |
|---|---|---|
|  | HStHO 1 | SD 4 |
| SMS | 8.9 | 34.8 |
| SMM | 47.2 | 34.2 |
| SDS | 0.7 | 0.8 |
| SDM | 5.4 | 4.2 |
| SDD | <0.1 | <0.1 |
| MMM | 31.9 | 21.6 |
| MMD | 5.2 | 2.0 |
| MDD | 0.8 | 2.5 |
| SUS | 9.6 | 35.6 |
| SUU | 52.6 | 38.4 |
| UUU | 37.9 | 26.1 |

S = saturated fatty acid,
M = monoenoic fatty acid and
D = dienoic fatty acid,
U = unsaturated fatty acid.

Example 3

1. Solvent Fractionation of High-Stearic High-Oleic Sunflower Oil

Solvent fractionation involves the mixing of high-stearic and high-oleic oil With an organic solvent, cooling down the resulting micelles, growing solid crystals and filtering the solids at vacuum. The resulting stearin cake is washed with fresh solvent to remove the olein entrapped in it. Solvent fractionation can be fulfilled with different solvents including hexane, acetone or ethyl ether. In the present example high-stearic high-oleic oil HStHO 1 was dissolved in an equal volume of hexane. Resulting micelles were set in a water bath at 0° C. and 5° C. for 96 h, then the precipitate was filtered and washed with fresh hexane at 0° C. or 5° C. respectively. Stearins were finally distilled to remove the solvent and characterized.

Tables 12 and 13 show a series of stearins obtained from HStHO1 oil by fractionation with hexane at different temperatures. Solvent fractionation increased the content of disaturated TAG by several fold, giving place to the fat of the invention, which presents high levels of disaturated TAG, with contents of AOSt and BOSt higher than 3.2 and 3.3 respectively. These fats were appropriate for confectionary uses, displaying high levels of &saturated TAG. They are healthy, free of linolenic acid and can be prepared from HStHO sunflower oil.

TABLE 12

Triacylglycerol composition of a high-stearic high-oleic sunflower oil (HStHO1), compared with stearins obtained from the same oli by solvent fractionation with hexane at a temperature of 0° C. (SH 3) and 5° C. (SH4).

| | Triacylglycerol composition (%) | | |
|---|---|---|---|
| | HStHO 1 | SH 3 | SH 4 |
| POP | 0.4 | 0.9 | 0.6 |
| POSt | 2.7 | 13.4 | 11.0 |
| POO | 7.6 | 2.7 | 1.6 |
| POL | 1.0 | 0.2 | 0.1 |
| PLL | <0.1 | <0.1 | <0.1 |
| StOSt | 4.4 | 37.1 | 52.5 |
| StOO | 33.0 | 15.1 | 8.9 |
| StLSt | 0.7 | 0.8 | 0.68 |
| OOO | 31.9 | 10.5 | 6.3 |
| StOL | 4.4 | 1.8 | 1.0 |
| OOL | 5.2 | 1.5 | 1.0 |
| OLL | 0.8 | <0.1 | <0.1 |
| AOSt | 0.8 | 6.3 | 6.9 |
| OOA | 2.9 | 1.1 | 0.7 |
| OLA | <0.1 | <0.1 | <0.1 |
| BOSt | 0.7 | 6.9 | 8.0 |
| OOB | 3.7 | 1.7 | 0.9 |

P = palmitic acid;
St = stearic acid;
O = oleic acid;
L = linoleic acid;
A = araquidic acid;
B = behenic acid

TABLE 13

Triacylglycerol class composition of a high-stearic high-oleic sunflower oil (HStHO1), compared with stearins obtained from the same oil by solvent fractionation with hexane at a temperature of 0° C. (SH 3) and 5° C. (SH 4).

| | Triacylglycerol class composition (%) | | |
|---|---|---|---|
| | HS1HO 1 | SH 3 | SH 4 |
| SMS | 8.9 | 64.6 | 79.0 |
| SMM | 47.2 | 20.6 | 12.1 |
| SDS | 0.7 | <0.1 | <0.1 |
| SDM | 5.4 | 2.0 | 1.1 |
| SDD | <0.1 | <0.1 | <0.1 |
| MMM | 31.9 | 10.5 | 6.3 |
| MMD | 5.2 | 1.5 | 1.0 |
| MDD | 0.8 | <0.1 | <0.1 |
| SUS | 9.6 | 64.6 | 79.0 |
| SUU | 52.6 | 22.6 | 13.2 |
| UUU | 37.9 | 12.0 | 7.3 |

S = saturated fatty acid,
M = monoenoic fatty acid and
D = dienoic fatty acid,
U = unsaturated fatty acid Example 4

1. Solvent Fractionation of High-Stearic High-Oleic Sunflower Oil Stearins

The fat of the invention is prepared by fractionation of HStHO sunflower oils. Alternatively, stearins obtained by dry fractionation or solvent fractionation can be enriched in disaturated TAG by further solvent fractionation.

A stearin obtained by dry fractionation from HStHO sunflower oil as described in Example 2, was dissolved in 3 volumes of acetone. These fat micelles were then cooled down to temperatures of 10 or 15° C., in this moment seeding with appropriated tempered stearin crystals obtained from previous fractionations was performed and the micelles kept at this temperature for 48 h. Then, they were filtered at vacuum in filtration plates set into a cold room using miracloth tissue as the filtration medium. Precipitates were washed with fresh solvent to remove the remaining olein entrapped within them and finally distilled at vacuum.

The step of solvent fractionation increased the content of disaturated TAG of the starting stearin of the example, especially StOSt, AOSt and BOSt, making and reaching a total content of TAG with the general structure SUS up to 79.3% (Tables 14 and 15). This fat is appropriate for confectionary, since it presents a high level of disaturated TAG. This fat is free of linolenic acid and is fully compatible with CB.

TABLE 14

Triacylglycerol composition of a stearin prepared from high-stearic high-oleic sunflower fat (SD 5), compared with stearins obtained from the same fat by solvent fractionation with acetone at 10° C. (SA 1) and 15° C. (SA 2).

| | Triacylglycerol composition (%) | | |
|---|---|---|---|
| | SD 5 | SA 1 | SA 2 |
| POP | 0.5 | 0.6 | 0.3 |
| POSt | 4.1 | 9.1 | 7.7 |
| POO | 6.7 | 3.1 | 1.2 |
| POL | 0.8 | 0.4 | 0.1 |
| PLL | <0.1 | <0.1 | <0.1 |
| StOSt | 12.6 | 37.7 | 57.8 |
| StOO | 29.5 | 15.7 | 6.8 |
| StLSt | 0.8 | 1.1 | 0.7 |
| OOO | 28.0 | 12.7 | 5.1 |
| StOL | 4.0 | 2.5 | 0.9 |
| OOL | 3.9 | 2.3 | 1.4 |
| OLL | 0.4 | 0.3 | <0.1 |
| AOSt | 1.7 | 5.4 | 7.7 |
| OOA | 2.3 | 1.4 | 0.5 |
| OLA | <0.1 | <0.1 | <0.1 |
| BOSt | 1.9 | 5.3 | 5.0 |
| OOB | 2.8 | 2.3 | 4.6 |

P = palmitic acid;
St = stearic acid;
O = oleic acid;
L = linoleic acid;
A = araquidic acid;
B = behenic acid

TABLE 15

Triacylglycerol class composition of a stearin prepared from high-stearic high-oleic sunflower fat (SD 5), compared with stearins obtained from the same fat by solvent fractionation with acetone at 10° C. (SA 1) and 15° C. (SA 2).

| | Triacylglycerol class composition (%) | | |
|---|---|---|---|
| | SD 5 | SA 1 | SA 2 |
| SMS | 20.8 | 58.2 | 78.6 |
| SMM | 41.2 | 22.4 | 13.2 |
| SDS | 0.8 | 1.1 | 0.7 |
| SDM | 4.8 | 2.9 | 1.0 |
| SDD | <0.1 | <0.1 | <0.1 |
| MMM | 28.0 | 12.7 | 5.1 |
| MMD | 3.9 | 2.3 | 1.4 |
| MDD | 0.4 | 0.3 | <0.1 |
| SUS | 21.6 | 59.3 | 79.3 |
| SUU | 46.0 | 25.3 | 14.2 |

TABLE 15-continued

Triacylglycerol class composition of a stearin prepared from
high-stearic high-oleic sunflower fat (SD 5), compared with
stearins obtained from the same fat by solvent fractionation
with acetone at 10° C. (SA 1) and 15° C. (SA 2).

| | Triacylglycerol class composition (%) | | |
|---|---|---|---|
| | SD 5 | SA 1 | SA 2 |
| UUU | 32.3 | 15.3 | 8.5 |

S = saturated fatty acid,
M = monoenoic fatty acid and
D = dienoic fatty acid,
U = unsaturated fatty acid Example 5

Fractionation of High-Stearic High-Oleic Sunflower
Oil at Different Temperatures The compositions of the different stearins obtained by fractionation of high-stearic high-oleic sunflower oils are different according to the conditions used in this process. Thus, it is possible to obtain stearins with different characteristics and melting profiles modifying the conditions of oil fractionation.

In the case of dry fractionation it is possible to accelerate the process by cooling down the oil to a temperature low enough to induce a quick formation of crystal nuclei (nucleation temperature), which usually ranged between 2 to 5° C. below the final crystallization temperature. After this step of nucleation the oil was warmed up to the final crystallization temperature for 20 to 50 h. Then, stearin was filtered in a jacketed Buchner funnel and entrapped olein removed applying vacuum. The nucleation temperature and time affected the final composition and yield of the stearin, as it did the final fractionation temperature (Table 16).

The level of saturated fatty acids in the stearins obtained at higher temperatures increased at expenses of lower yields of precipitate. Lower nucleation temperatures gave place to stearins with lower levels of disaturated TAG although they accelerate the whole fractionation process.

TABLE 16

Ranges of composition of disaturated triacylglycerols and triacylglycerol
classes in stearins resulting from dry fractionation of HStHO
1 oil (Table 4) at different final temperatures. The differences in stearin
composition within each temperature are due to different
nucleation conditions.

| | Final crystallization temperature Triacylglycerol content range (%) | | | |
|---|---|---|---|---|
| | 17.0° C. | 17.5° C. | 18.5° C. | 19.0° C. |
| StOSt | 6.9-12.9 | 6.7-18.8 | 9.9-23.7 | 12.6-24.2 |
| StOP | 3.0-4.3 | 3.0-5.8 | 3.5-6.6 | 4.1-6.2 |
| AOSt | 1.1-1.9 | 1.1-3.0 | 1.5-3.4 | 1.7-3.3 |
| BOSt | 1.2-2.1 | 1.1-3.3 | 1.5-3.4 | 1.9-3.5 |
| SUS | 12.6-22.0 | 12.2-31.4 | 16.7-38.6 | 20.8-38.8 |
| SUU | 51.7-46.5 | 51.2-41.3 | 50.1-36.6 | 46.7-36.7 |
| UUU | 35.8-31.9 | 36.2-27.3 | 33.1-24.7 | 32.5-21.2 |

P = palmitic acid;
St = stearic acid;
O = oleic acid;
A = araquidic acid;
B = behenic acid.
S = saturated fatty acid,
U = unsaturated fatty acid.

In the case of solvent fractionation the final composition of stearins change in functions of the conditions in which the crystallization is carried out. In the case of solvent fractionation the parameters that are usually modified are the temperature and the amount of solvent that is added to the oil, Data corresponding to several fractionations with hexane are shown in Table 17. In these fractionations, oils were mixed with different volumes of hexane, in proportions that varied from 25% to 75% of oil in the final micelles. Oil-hexane mixtures were cooled down to 0 or 5° C. for 72 h and filtered in a Buchner al vacuum. The stearins were then washed with fresh hexane at the fractionation temperature. Finally they were distilled to remove the solvent to be characterized.

Fractionation at higher temperatures yields stearins with a higher content of disaturated TAG at expenses of yield and recovery. A similar effect was observed at increasing the amount of hexane in the fractionation mixture. Thus, micelles containing more hexane give place to stearins with higher disaturated TAG content and higher melting points than micelles with a higher concentration of oil. Furthermore, adjusting the fractionation conditions, HStHO 1 and HStHO 2, produced fractions with similar composition. Thus, the initial stearin content of the starting oil does not substantially influence the outcome of the fractionation.

TABLE 17

Ranges of composition of disaturated triacylglycerols and triacylglycerol
classes in stearins resulting from fractionation of HStHO 1 and HStHO
2 (Tables 4 and 6) with hexane at different temperatures.
The differences in stearin composition within each temperature are due to
different proportions of hexane in the fractionation mixture. They varied
from 25 to 75% oil in the final micelles.

| | Disaturated triacylglycerol range (%) | | | |
|---|---|---|---|---|
| | HStHO1 | | HStHO2 | |
| | 0° C. | 5° C. | 0° C. | 5° C. |
| StOSt | 11.7-57.5 | 15.7-52.5 | 30.7-45.6 | 28.0-63.2 |
| StOP | 6.2-11.0 | 6.5-11.0 | 14.3-13.1 | 12.1-9.1 |
| AOSt | 2.0-7.5 | 2.7-6.9 | 6.1-7.4 | 5.1-7.8 |
| BOSt | 1.9-8.8 | 2.8-8.0 | 6.6-8.9 | 5.6-10.5 |
| SUS | 22.4-85.9 | 28.3-79.6 | 59.6-77.4 | 52.4-91.5 |
| SUU | 53.9-9.8 | 43.3-13.2 | 29.9-17.3 | 33.9-6.3 |
| UUU | 23.7-4.4 | 28.0-7.3 | 10.4-5.3 | 13.7-2.0 |

P = palmitic acid;
St = stearic acid;
O = oleic acid;
A = araquidic acid;
B = behenic acid.
S = saturated fatty acid,
U = unsaturated fatty acid Example 6

Determination of Melting Intervals and Contents of
Solids by Differential Scanning Calorimetry Differential scanning calorimetry or DSC is a thermoanalytical technique in which the difference in the amount of heat required to increase the temperature of a sample and reference are measured as a function of temperature. This technique allowed determining the melting interval of different fats and stearins. Furthermore, the content of solids of the fat at different temperatures was calculated by integrating the heat flow signal. The melting profiles of the fats were determined by differential scanning calorimetry (DSC) in a Q100 scanner (TA instruments, New Castle, Del., USA). Results were processed using the TA analysis software provided by the manufacturer. This instrument was calibrated by using metallic Indium (melting point 156.6° C., $\Delta H_f$=28.45 J/g) prior to use. Samples were prepared by transferring amounts of the melted oils and fat fractions of 6 to 8 mg to aluminum pans and weighting them in a precision microbalance (Sartorius M2P Microbalance). Pans were then sealed and submitted to calorimetric balance. An empty sealed capsule was used as the reference, To study melting profiles, samples were kept at 90° C. for 10 min. to destroy any previous structure; then samples were cooled to 0° C. for 30 min. and kept at 5° C. during 24 h. Finally, they were transferred to an oven at 26° C. for 48 h. Samples were loaded in the calorimeter at 20° C., temperature was quickly decreased to −40° C. and then it was increased to 90° C. at a 10° C./min rate. Solid fat contents (SFC) were determined by continuous integration of the DSC melting curves using the TA universal analysis software.

Different stearins prepared by dry and solvent fractionation from different high-stearic high-oleic oils were analyzed by DSC and compared with standard cocoa butter. The composition of these fats is shown in Tables 18 and 19.

TABLE 18

Triacylglycerol composition of different stearins prepared by solvent fractionation from high-stearic high-oleic oils.

| | Triacylglycerol composition (%) | | | | | | | |
|---|---|---|---|---|---|---|---|---|
| | SA 3 | SA 4 | SH 5 | SA 5 | SA 2 | SH 6 | SH 7 | SH 8 |
| POP | 1.0 | 0.6 | 1.0 | 0.7 | 0.3 | 0.3 | 0.3 | 0.4 |
| POSt | 13.7 | 8.6 | 13.6 | 12.3 | 7.7 | 6.5 | 7.2 | 7.1 |
| POO | 3.6 | 4.3 | 3.0 | 1.1 | 1.2 | 1.2 | 0.7 | 0.2 |
| POL | 0.3 | 0.5 | 0.2 | 0.2 | 0.1 | 0.2 | 0.4 | <0.1 |
| StOSt | 35.8 | 32.5 | 39.9 | 56.0 | 57.8 | 65.3 | 67.3 | 74.3 |
| StOO | 15.9 | 20.1 | 14.4 | 6.2 | 6.8 | 4.7 | 3.7 | 1.5 |
| StLSt | 1.0 | 0.9 | 2.0 | 0.5 | 0.7 | 0.1 | 0.2 | <0.1 |
| OOO | 13.2 | 17.1 | 6.1 | 3.6 | 5.1 | 4.1 | 2.9 | 0.9 |
| StOL | 1.8 | 2.5 | 1.2 | 0.6 | 0.9 | 0.4 | 0.1 | <0.1 |
| OOL | 1.8 | 2.3 | 0.8 | 0.6 | 1.4 | 0.5 | 0.4 | <0.1 |
| OLL | 0.1 | 0.2 | <0.1 | 0.4 | <0.1 | <0.1 | <0.1 | <0.1 |
| AOSt | 4.4 | 3.2 | 6.9 | 7.4 | 7.7 | 7.0 | 7.4 | 7.1 |
| OOA | 1.2 | 1.6 | 1.1 | 0.3 | 0.5 | 0.5 | 0.7 | 0.6 |
| BOSt | 4.4 | 3.3 | 7.9 | 8.4 | 5.0 | 8.2 | 8.3 | 6.6 |
| OOB | 1.7 | 2.3 | 1.8 | 1.8 | 4.6 | 0.9 | 0.5 | 1.4 |

P = palmitic acid;
St = Stearic acid;
O = oleic acid;
L = linoleic acid;
A = araquidic acid;
B = behenic acid

TABLE 19

Triacylglycerol classes composition of different stearins prepared by solvent fractionation, SA is solvent acetone and SH is solvent hexane, from high-stearic high-oleic oils.

| | Triacylglycerol class composition (%) | | | | | | | |
|---|---|---|---|---|---|---|---|---|
| | SA 3 | SA 4 | SH 5 | SA 5 | SA 2 | SH 6 | SH 7 | SH 8 |
| SMS | 59.3 | 48.2 | 69.3 | 84.7 | 78.6 | 87.3 | 90.4 | 95.5 |
| SMM | 22.4 | 28.3 | 20.3 | 9.4 | 13.2 | 7.4 | 5.6 | 3.7 |
| SDS | 1.0 | 0.9 | 2.0 | 0.5 | 0.7 | 0.1 | 0.2 | <0.1 |
| SDM | 2.1 | 3.0 | 1.4 | 0.8 | 1.0 | 0.6 | 0.5 | <0.1 |
| SDD | <0.1 | <0.1 | <0.1 | <0.1 | <0.1 | <0.1 | <0.1 | <0.1 |
| MMM | 13.2 | 17.1 | 6.1 | 3.6 | 5.1 | 4.1 | 2.9 | 0.9 |
| MMD | 1.8 | 2.3 | 0.6 | 0.8 | 1.4 | 0.5 | 0.4 | <0.1 |
| MDD | 0.1 | 0.2 | <0.1 | 0.4 | <0.1 | <0.1 | <0.1 | <0.1 |
| SUS | 60.3 | 49.1 | 71.3 | 85.2 | 79.3 | 87.4 | 90.6 | 95.5 |
| SUU | 24.5 | 31.3 | 21.7 | 10.2 | 14.2 | 8.0 | 6.1 | 3.7 |

TABLE 19-continued

Triacylglycerol classes composition of different stearins prepared by solvent fractionation, SA is solvent acetone and SH is solvent hexane, from high-stearic high-oleic oils.

| | Triacylglycerol class composition (%) | | | | | | | |
|---|---|---|---|---|---|---|---|---|
| | SA 3 | SA 4 | SH 5 | SA 5 | SA 2 | SH 6 | SH 7 | SH 8 |
| UUU | 15.1 | 19.6 | 6.9 | 4.6 | 6.5 | 4.6 | 3.3 | 0.9 |

S = saturated fatty acid,
M = monoenoic fatty acid and
D = dienoic fatty acid,
U = unsaturated fatty acid Confectionary fats require a high level of disaturated TAG to achieve the necessary properties involving high levels of solids, which make these fat brittle, and a quick melting interval. This profile is displayed typically by CB (Table 2) as it is shown in Table 20.

TABLE 20

Content of solids at different temperatures of stearins obtained by solvent fractionation from high-stearic high-oleic sunflower. (For composition see Tables 18 and 19).

| | Temperature (° C.)/Solid content (%) | | | | |
|---|---|---|---|---|---|
| | 30° C. | 32.5° C. | 35° C. | 37.5° C. | 40° C. |
| SA 4 | 38.9 | 25.6 | 10.8 | 2.1 | 0.0 |
| SA 3 | 50.0 | 36.8 | 17.4 | 4.3 | 0.2 |
| SH 5 | 57.5 | 42.2 | 26.7 | 14.3 | 6.3 |
| SA 2 | 82.1 | 74.1 | 52.7 | 23.1 | 6.4 |
| SA 5 | 78.8 | 69.0 | 45.8 | 17.5 | 3.5 |
| SH 6 | 91.3 | 85.0 | 62.8 | 29.6 | 9.1 |
| SH 7 | 86.0 | 79.5 | 62.0 | 32.9 | 11.0 |
| SH 8 | 94.5 | 91.6 | 82.2 | 47.5 | 15.4 |

Fats with a lower content of total disaturated TAG displayed similar or something lower contents of solids than CB at temperatures around 30° C. (SA 3 and SA 4). However, these fats kept high solids contents at these temperatures, and their melting behavior was similar to CB at temperatures higher than 30° C., due to the presence of the high melting point TAG AOSt and BOSt. When the high-stearic high-oleic sunflower stearins displayed similar content of disaturated TAG than CB (SH 5 and SA 5) they displayed higher content of solids than CB provided these fats contains TAG of a high melting point such as AOSt and BOSt. Sunflower fats with higher content of disaturated TAG displayed a bigger percentage of solids and more elevated melting intervals, between 35 and 40° C., but were fully compatible with CB, so they can be used in blends with CB to improve the characteristics of confectionary at high temperatures. The content of solids at different temperatures of fractions in Table 20 correlated well with the SMS content.

Solvent fractionation of high-stearic high-oleic sunflower oils is an efficient way to produce high melting point sunflower fats. Amongst different solvents, acetone was especially appropriate because it induced a quick precipitation of the stearin at temperatures ranging 10-15° C. Depending on the starting oils, the ratio oil/solvent and temperature stearins with different TAG composition were obtained. All these stearins were in the high range of disaturated TAG content (67-82%, Tables 21 and 22).

TABLE 21

Triacylglycerol composition of different stearins prepared by fractionation with acetone from HStHO 1 (Table 4, SA 6, SA 11, SA 12) and HStHO 2 (Table 6, SA 7, SA 8, SA 9, SA 10) high-stearic high-oleic oils. Fractions corresponded to fractionations at 10 and 15° C. using different oil/solvent ratios.

| | Triacylglycerol composition (%) | | | | | | |
|---|---|---|---|---|---|---|---|
| | SA 6 | SA 7 | SA 8 | SA 9 | SA 10 | SA 11 | SA 12 |
| POP | 0.7 | 0.9 | 1.0 | 0.9 | 0.9 | 0.7 | 0.7 |
| POSt | 10.8 | 12.5 | 13.8 | 14.0 | 15.0 | 11.7 | 11.9 |
| POO | 2.5 | 3.0 | 2.7 | 2.3 | 1.9 | 1.5 | 1.4 |
| POL | 0.2 | 0.3 | 0.2 | 0.2 | 0.1 | 0.1 | 0.1 |
| StOSt | 42.8 | 39.5 | 41.4 | 43.7 | 46.9 | 52.7 | 53.2 |
| StOO | 13.8 | 14.7 | 13.9 | 12.1 | 9.8 | 8.5 | 8.4 |
| StLSt | 0.7 | 0.7 | 0.8 | 0.7 | 0.6 | 0.3 | 0.8 |
| OOO | 10.4 | 8.2 | 7.3 | 6.3 | 4.8 | 5.5 | 5.4 |
| StOL | 2.0 | 1.4 | 1.4 | 1.1 | 0.8 | 0.8 | 0.9 |
| OOL | 1.7 | 1.0 | 0.8 | 0.7 | 0.5 | 0.9 | 0.8 |
| OLL | <0.1 | <0.1 | <0.1 | <0.1 | <0.1 | <0.1 | <0.1 |
| AOSt | 5.8 | 6.9 | 6.8 | 7.4 | 8.1 | 7.4 | 7.2 |
| OOA | 1.1 | 1.3 | 1.0 | 1.0 | 1.0 | 0.5 | 0.5 |
| BOSt | 5.8 | 7.7 | 7.1 | 8.1 | 8.4 | 8.1 | 7.5 |
| OOB | 1.7 | 2.0 | 1.7 | 1.5 | 1.2 | 1.2 | 1.1 |

P = palmitic acid;
St = stearic acid;
O = oleic acid;
L = linoleic acid;
A = araquidic acid;
B = behenic acid

TABLE 22

Triacylglycerol class composition of different stearins prepared by fractionation with acetone from HStHO 1 (Table 4, SA 6, SA 11, SA 12) and HSHO 2 (Table 6, SA 7, SA 8, SA 9, SA 10) high-stearic high-oleic oils. Fractions corresponded to fractionations at 10 and 15° C. using different oil/solvent ratios.

| | Triacylglycerol class composition (%) | | | | | | |
|---|---|---|---|---|---|---|---|
| | SA 6 | SA 7 | SA 8 | SA 9 | SA 10 | SA 11 | SA 12 |
| SMS | 65.9 | 67.5 | 70.1 | 74.1 | 79.3 | 80.6 | 80.5 |
| SMM | 19.1 | 21 | 19.3 | 16.9 | 13.9 | 11.7 | 11.4 |
| SDS | 0.7 | 0.7 | 0.8 | 0.7 | 0.6 | 0.3 | 0.8 |
| SDM | 2 | 1.4 | 1.4 | 1.1 | 0.8 | 0.8 | 0.9 |
| SDD | <0.1 | <0.1 | <0.1 | <0.1 | <0.1 | <0.1 | <0.1 |
| MMM | 10.4 | 8.2 | 7.3 | 6.3 | 4.8 | 5.5 | 5.4 |
| MMD | 1.7 | 1 | 0.8 | 0.7 | 0.5 | 0.9 | 0.8 |
| MDD | <0.1 | <0.1 | <0.1 | <0.1 | <0.1 | <0.1 | <0.1 |
| SUS | 66.6 | 68.2 | 70.9 | 74.8 | 79.9 | 80.9 | 81.3 |
| SUU | 21.1 | 22.4 | 20.7 | 18 | 14.7 | 12.5 | 12.3 |
| UUU | 12.1 | 9.2 | 8.1 | 7 | 5.3 | 6.4 | 6.2 |

S = saturated fatty acid,
M = monoenoic fatty acid and
D = dienoic fatty acid,
U = unsaturated fatty acid Once again, the higher the levels of disturbed TAG, the higher the content of solids of the corresponding fats (Table 23). All these fats displayed contents of solids higher than cocoa butter at temperatures higher than 30° C. although some of them contained less saturated fatty acids. This effect was caused by the presence of TAG like AOSt and BOSt, which display melting points higher than those of the disaturated TAG found in CB. These fats were fully compatible with CB, so they can be used in blends with CB to improve the characteristics of confectionary at high temperatures.

TABLE 23

Content of solids at different temperatures of stearins prepared by fractionation with acetone from HStHO 1 (Table 4, SA 6, SA 11, SA 12) and HStHO 2 (Table 6, SA 7, SA 8, SA 9, SA 10) high-stearic high-oleic oils. Fractions corresponded to fractionations at 10 and 15° C. using different oil/solvent ratios.

| | Temperature (° C.)/Solid content (%) | | | | |
|---|---|---|---|---|---|
| | 30° C. | 32.5° C. | 35° C. | 37.5° C. | 40° C. |
| SA 7 | 56.3 | 43.2 | 29.2 | 16.7 | 8.1 |
| SA 6 | 57.2 | 45.2 | 31.8 | 19.1 | 9.7 |
| SA 8 | 61.1 | 48.8 | 34.9 | 21.5 | 11.3 |
| SA 9 | 64.1 | 50.9 | 35.3 | 20.7 | 10.3 |
| SA 10 | 70.0 | 55.7 | 38.3 | 22.4 | 11.2 |
| SA 11 | 71.8 | 57.6 | 40.0 | 23.5 | 11.8 |
| SA 12 | 74.9 | 62.3 | 45.6 | 28.1 | 14.8 |

Example 7

Studies of Compatibility of the Fat of the Invention with CB

Sometimes fats used as alternatives to CB like lauric and hydrogenated fats produce eutectic mixtures, in which the melting interval of the fat blend is lower than that displayed by both fats separately.

To study compatibility of the fat of the invention with CB to produce improved confectionary fats, both fats were melted and blends of different proportions were prepared. Thereafter, the solid content of the blends was determined by differential scanning calorimetry as described in example 6. The fats used in this example were CB1 (Table 2) and SH15, which composition is shown in Tables 18 and 19. The lines corresponding to solid fat content at constant temperatures (FIG. 1) were parallel and did not show the presence of any eutectic, which means that the fat of the invention is fully compatible with cocoa butter and it can be used to be mixed with CB in any proportion to produce confectionary fats with improved characteristics. These fats, unlike other CB alternatives are healthy because they are free of medium-chained and trans fatty acids. Moreover, they have very low saturates in sn-2 position and can be obtained from a sunflower mutant that can also be grown in countries with temperate climate.

Example 8

Preparation of a Chocolate Bar with the Fat of the Invention

The fat of the invention can be used for preparation of all classes of confectionary products. In the present example a chocolate bar was prepared using a recipe available in literature (W. C. Trebor "Chocolate and confectionary", 1950). The following ingredients were used:
- 34.6 g fat SH5
- 21.6 g chocolate powder
- 43.4 g sugar
- 0.3 g soy lecithin The fat was melted and kept at 50° C. At this temperature the soy lecithin was added and the mixture was homogenate. Afterwards chocolate powder and sugar were added with continuous manual stirring. The resulting mixture was let to cool down to 25° C. Then it was slowly heated again to 30° C. with soft stirring, and it was finally poured in a appropriate cast. The mixture was let to cool at room temperature overnight and chocolate bars with good palatability and organoleptic characteristics were obtained.

This recipe could be made with equally good results with other fats mentioned in this patent application or blends of these fats with cocoa butter in any proportion.

Example 9

Preparation of a Chocolate Bar with a Mixture of the Fat of the Invention and Palm Mid Fraction The fat of the invention can be mixed with other fats to produce confectionary products of appropriate properties. Thus, palm mid fractions are fats prepared from palm oil by dry fractionation. These usually have low contents of polyunsaturated and trisaturated TAG and high contents of the desaturated TAGS POP and POSt. These fats are usually mixed with tropical fats rich in stearic acid for the production of confectionary fats. In the present example we prepared a chocolate bar using a mixture of palm mid fraction with one of the fats of the invention obtained by fractionation with acetone. Ingredients used were:

13.6 g palm mid fraction
20.7 g fat SA 2
21.6 g chocolate powder
43.4 g sugar
0.3 g soy lecithin The chocolate bar of the example was prepared in a similar way as described in Example 8. The chocolate made with this fat mixture displayed the expected aspect and texture, with good organoleptic properties.

Example 10

Preparation of a Chocolate Bar with a Mixture of the Fat of the Invention, Palm Mid Fraction and Cocoa Butter European laws allow the addition of a maximum of 5% of non-lauric, trans-free fats compatible with CB to chocolate. The claimed fat is free of lauric and trans fatty acids and it is fully compatible with CB. In the present example a chocolate bar was prepared using cocoa butter and a 5% of a mixture of palm mid fraction with one of the fats of the invention obtained by fractionation with acetone. Ingredients used were:

32.9 g cocoa butter
1.04 g fat SA 2
0.7 g palm mid fraction
21.6 g chocolate powder
43.4 g sugar
0.3 g soy lecithin The chocolate bar of the example was prepared in a similar way as described in example 8. The chocolate made with this fat mixture displayed the texture and organoleptic properties expected in a standard chocolate.

The invention claimed is:

1. A solid sunflower fat comprising in its triacylglycerol fraction at least 49.1% triacylglycerol of the general formula SUS, between 32.5% and 74.3% triacylglycerol of the general formula StOSt, between 3.2% and 8.1% triacylglycerol of the general formula AOSt and between 3.3% and 10.3% triacylglycerol of the general formula BOSt, wherein the fatty acids in positions sn-1 and sn-3 of the glycerol are the two external characters in the triacylglycerol formula, S represents a saturated fatty acid, U represents an unsaturated fatty acid, St represents stearic acid, O represents oleic acid, A represents arachidic acid and B represents behenic acid.

2. The solid sunflower fat as claimed in claim 1, comprising between 39.9% and 74.3% of the triacylglycerol of the formula StOSt.

3. The solid sunflower fat as claimed in claim 1, comprising between 4% and 8.1% of the triacylglycerol of the formula AOSt.

4. The solid sunflower fat as claimed in claim 1, comprising between 4.5% and 10.3% of the triacylglycerol of the formula BOSt.

5. The solid sunflower fat as claimed in claim 1, comprising between 39.9% and 74.3% StOSt, between 4.4% and 8.1% AOSt and between 4.4% and 10.3% BOSt.

6. A solid sunflower fat as claimed in claim 1, comprising between 42.8% and 74.3% StOSt, between 5.8% and 7.4% AOSt and between 5.8% and 8.3% BOSt.

7. A solid sunflower fat as claimed in claim 1, wherein the oil has a solid fat content of 38.9% to 94.5% at 30° C.

8. A solid sunflower fat as claimed in claim 1 obtainable from high-stearic high-oleic sunflower oil by fractionation.

9. A solid sunflower fat as claimed in claim 8, wherein the fractionation is low temperature dry fractionation comprising the following steps: a) heating a high-stearic high-oleic sunflower oil up to about 60° C. and decreasing the temperature to reach temperatures from 16 to 22° C. with soft stirring and maintaining the oil at this temperature for 20 to 50 hours; b) separating the solid stearin from the olein by filtration; and c) pressing the stearin cake at up to 5 bar to expel the remaining olein trapped in it.

10. A solid sunflower fat as claimed in claim 8, wherein the fractionation is solvent fractionation comprising the following steps: a) mixing a high-stearic high-oleic sunflower oil with an organic solvent; b) decreasing the temperature of the resulting micelle to −3 to 15° C. with stirring and maintaining the oil at this temperature up to 96 hours; c) separating the solid stearin fraction by filtration; d) washing the solid phase with cold fresh solvent to remove the rest of the micelles entrapped into the precipitate; and e) removing the solvent.

11. A solid sunflower fat as claimed in claim 10, wherein the organic solvent is selected from the group consisting of acetone, hexane, and ethyl ether.

12. A solid sunflower fat as claimed in claim 10, wherein removing the solvent comprises distillation at vacuum.

13. A solid sunflower fat as claimed in claim 8, wherein the fractionation is low temperature dry fractionation comprising the following steps: a) heating a high-stearic high-oleic sunflower oil up to about 60° C. and decreasing the temperature to reach temperatures from 17 to 19° C., with soft stirring and maintaining the oil at this temperature for 24 to 35 hours; b) separating the solid stearin from the olein by filtration; and c) pressing the stearin cake at up to 30 bar to expel the remaining olein trapped in it.

14. A solid sunflower fat as claimed in claim 8, wherein the fractionation comprises the step of adding tempered crystals for seeding.

15. A confectionary product including a solid sunflower fat of claim 1.

16. The confectionary product according to claim 15, wherein the confectionary product is a chocolate bar.

17. The solid sunflower fat as claimed in claim 1, comprising between 45% and 74.3% of the triacylglycerol of the formula StOSt.

18. The solid sunflower fat as claimed in claim 1, comprising between 50% and 74.3% of the triacylglycerol of the formula StOSt.

19. The solid sunflower fat as claimed in claim 1, comprising between 4.5% and 8.1% of the triacylglycerol of the formula AOSt.

20. The solid sunflower fat as claimed in claim 1, comprising between 5% and 10.3% of the triacylglycerol of the formula BOSt.

21. The solid sunflower fat as claimed in claim 1, comprising between 6% and 10.3% of the triacylglycerol of the formula BOSt.

22. A solid sunflower fat as claimed in claim 8, wherein the fractionation is low temperature dry fractionation comprising the following steps: a) heating a high-stearic high-oleic sunflower oil up to about 60° C. and decreasing the temperature to reach temperatures from 17 to 19° C. with stirring and maintaining the oil at this temperature for 24 to 35 hours; b) separating the solid stearin from the olein by filtration; and c) pressing the stearin cake at up to 10 bar to expel the remaining olein trapped in it.

23. A method for the dry fractionation of high-stearic high-oleic sunflower oil, comprising the following steps: a) heating a high-stearic high-oleic oil up to about 60° C., decreasing the temperature to reach temperatures from 16 to 22° C. with stirring, adding tempered crystals for seeding, and maintaining the oil at this temperature for 20 to 50 hours; b) separating the solid stearin from the olein by filtration; and c) pressing the stearin cake at up to 30 bar to expel the remaining olein trapped in it.

24. The method as claimed in claim 23, comprising the following steps: a) heating a high-stearic high-oleic oil up to about 60° C. and decreasing the temperature to reach temperatures from 17 to 19° C. with stirring and maintaining the oil at this temperature for 24 to 35 hours; b) separating the solid stearin from the olein by filtration; and c) pressing the stearin cake at up to 10 bar to expel the remaining olein trapped in it.

25. The method as claimed in claim 23, comprising the following steps: a) heating a high-stearic high-oleic oil up to about 60° C. and decreasing the temperature to reach temperatures from 17 to 19° C. with stirring and maintaining the oil at this temperature for 24 to 35 hours; b) separating the solid stearin from the olein by filtration; and c) pressing the stearin cake at up to 5 bar to expel the remaining olein trapped in it.

26. A method for the solvent fractionation of high-stearic high-oleic sunflower oil, comprising the following steps: a) mixing a high-stearic high-oleic oil with an organic solvent; b) decreasing the temperature of the resulting micelle to −3 to 15° C. with stirring, adding tempered crystals for seeding, and maintaining the oil at this temperature up to 96 hours; c) separating the solid stearin fraction by filtration; d) washing the solid phase with cold fresh solvent to remove the rest of the micelles entrapped into the precipitate; and e) removing the solvent.

27. The method as claimed in claim 26, comprising the following steps: a) mixing a high-stearic high-oleic oil with an organic solvent; b) decreasing the temperature of the resulting micelle to 2 to 10° C. with stirring and maintaining the oil at this temperature up to 96 hours; c) separating the solid stearin fraction by filtration; d) washing the solid phase with cold fresh solvent to remove the rest of the micelles entrapped into the precipitate; and e) removing the solvent.

28. The method as claimed in claim 26, wherein the organic solvent is selected from the group consisting of acetone, hexane, and ethyl ether.

29. The method as claimed in claim 26, wherein removing the solvent comprises distillation at vacuum.

\* \* \* \* \*